(12) United States Patent
Ishihara

(10) Patent No.: US 7,110,045 B2
(45) Date of Patent: Sep. 19, 2006

(54) Y/C SEPARATOR AND Y/C SEPARATING METHOD

(75) Inventor: Ken Ishihara, Atsugi (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 526 days.

(21) Appl. No.: 10/470,018

(22) PCT Filed: Jan. 24, 2002

(86) PCT No.: PCT/JP02/00503

§ 371 (c)(1),
(2), (4) Date: Jul. 23, 2003

(87) PCT Pub. No.: WO02/060188

PCT Pub. Date: Aug. 1, 2002

(65) Prior Publication Data

US 2004/0119892 A1    Jun. 24, 2004

(30) Foreign Application Priority Data

Jan. 24, 2001   (JP) .............................. 2001-016284

(51) Int. Cl.
*H04N 9/78* (2006.01)
(52) U.S. Cl. ...................................... 348/663; 348/665
(58) Field of Classification Search ............... 348/663, 348/665, 667; H04N 9/77, 9/78
See application file for complete search history.

(56) References Cited

U.S. PATENT DOCUMENTS 5,361,103 A * 11/1994 Naka et al. ................. 348/663
6,384,873 B1 * 5/2002 Rumreich et al. .......... 348/667

FOREIGN PATENT DOCUMENTS

| JP | 4-340891 | 11/1992 |
| JP | 5-115073 | 5/1993 |
| JP | 8-265798 | 10/1996 |

* cited by examiner

*Primary Examiner*—Sherrie Hsia
(74) *Attorney, Agent, or Firm*—Finnegan, Henderson, Farabow, Garrett & Dunner LLP

(57) ABSTRACT

A Y/C separator improving characteristics of dot crawl elimination and cross-color interference elimination even at a sampling frequency unequal to an integer multiple of a color subcarrier frequency of an NTSC television signal. A received composite color television signal is quantized by a clock signal with a frequency synchronized to the horizontal sync signal of an input signal. Chrominance component values are extracted in various directions of a target sample by using neighboring samples of the target sample. The chrominance component is obtained by selecting and outputting the extracted chrominance component values in accordance with correlation values of the corresponding samples from which the color component is removed. The calculation of the chrominance component extraction value is carried out by detecting the phase rotation angle of the color subcarrier signal per clock near the target sample, and in response to the detected value.

23 Claims, 8 Drawing Sheets

Y/C SEPARATOR AND Y/C SEPARATING METHOD

TECHNICAL FIELD

The present invention relates to an apparatus and method of separating an NTSC analog television signal, which undergoes analog/digital conversion using a particular sampling frequency, into a luminance (Y) signal and a chrominance (C) signal, and more particularly to a Y/C separator and Y/C separating method of the NTSC television signal capable of reducing the amount of a luminance component signal appearing in a Y/C-separated color component signal or the amount of a color component signal appearing in a Y/C-separated luminance signal when the sampling frequency in the analog/digital conversion is not equal to an integer multiple of a color subcarrier frequency of the television signal, even if a television video signal source containing time-based fluctuations (jitter) such as a VCR (Video Cassette Recorder) source is input.

BACKGROUND ART

In an NTSC analog television signal, the signal in a picture period (video signal except for blanking-period) consists of a mixture of a luminance signal (Y) that is amplitude modulated and a color signal modulated by a color subcarrier signal. In addition, the NTSC analog television signal itself includes the vertical and horizontal sync component signals and the so-called color burst signal that is used by a television receiver as a reference to demodulate color. The signal of this type is a composite signal, which is usually called a color composite video signal. To display the color composite video signal, the television receiver side separates the luminance signal and the color signal by decoding the color composite video signal (compound signal), and further decodes the color signal into the RGB color signals.

The so-called NTSC analog television signal, which is also called a composite video signal, includes the picture period expressed by the following equation.

$$Comp(t) = Y(t) + C(t)$$
$$= Y(t) + U(t)\sin(\omega t) + V(t)\cos(\omega t)$$

where Comp(t) is a television signal during the picture period, Y is the luminance signal, C is a chrominance signal, U and V are color signals (U=R−Y and V=B−Y, where R=red signal and B=blue signal), ω is an angular frequency of the color subcarrier signal and t is time.

The Y/C separation of the NTSC analog television signal refers to restoring Y(t) and C(t) independently from the Comp(t) signal. Since the frequency bands of Y(t) and C(t) overlap on each other, complete separation is usually difficult. However, a variety of Y/C separating methods have been proposed and performed conventionally which utilize the color subcarrier signal frequency, or the relationship between the color subcarrier frequency and the horizontal or vertical scanning frequency of the television signal.

A Y/C one-dimensional separating method utilizes the output of a bandpass filter, having a central frequency that equals the color subcarrier frequency of the color signal, as the color component signal, and its remainder as the luminance component signal. Another method, a two-dimensional Y/C separation (comb filter) method, utilizes the fact that the relationship between the color subcarrier frequency and the horizontal scanning frequency in the television signal, that is, the phase difference of the color subcarrier frequency between adjacent scanning lines, is 180 degrees. Assuming that the images of the adjacent scanning lines have a correlation, the luminance signal is computed from the sum of the adjacent scanning lines, and the color signal from the difference between the adjacent scanning lines. This two-dimensional Y/C separating method utilizes as the data of the adjacent scanning lines: (1) the data of the upper or lower scanning line of a target scanning line; or (2) the data of both the upper and lower scanning lines of the target scanning line. Alternatively, there is a method that utilizes, instead of the scanning line data in the same field, the data of the upper and lower scanning lines in adjacent fields or the data of the corresponding scanning line in the adjacent frame. This method, utilizing the data of the inter-field or inter-frame scanning line(s), is referred to as three-dimensional Y/C separation. It is used in conjunction with motion detection in the time axis direction. An adaptive Y/C separating method of switching between the three-, two- and one-dimensional Y/C separating methods is usually used: When no motion is detected, three dimensional Y/C separation is used; when the motion is detected, the two-dimensional Y/C separating method, specifically one of the variety of the two-dimensional Y/C separating methods is used in accordance with the correlation between the scanning lines; and when no correlation is present between the scanning lines, the one-dimensional Y/C separation is used.

The above-mentioned various types of adaptive Y/C separation are selected and used in accordance with the demand for the reduction in the amount of the luminance component signal appearing in the separated color signal, or the reduction in the amount of the color component signal appearing in the separated luminance signal. Generally, the reduction in the amount of the color component signal appearing in the separated luminance signal is referred to as dot crawl elimination, and the reduction in the amount of the luminance component signal appearing in the separated color signal is referred to as a cross-color interference elimination. Furthermore, as for the Y/C separation, a variety of methods are proposed and performed such as those implemented without degrading the total image quality, or those with high cost performance which meet the purpose of equipment adopting the methods. However, they have various problems to be solved at present.

The foregoing two-dimensional Y/C separating methods were carried out using a glass delay line or an analog method utilizing a CCD previously, and now use digital processing.

However, the mainstream of the Y/C separating methods in the conventional digital processing assumes a digital signal that is sampled by a sampling clock signal with a frequency that is an integer multiple of the color subcarrier frequency, such as a frequency 2 fsc or 4 fsc, twice or four times the color subcarrier frequency fsc. This is due to the fact that the Y/C separating methods process the digital signal instead of processing the analog video signal by an analog circuit, and output an analog signal, that is, a signal with analog timing, at the final stage.

Recently, a novel technique has been proposed. Although the conventional techniques digitize the analog signal for carrying out the digital processing, that is, digitize only the level of the analog signal with maintaining the time axis of the analog signal, the new technique digitizes not only the level, but also the time axis, thereby carrying out complete digitization to carry out transmission or recording.

As for the NTSC color television signal, the color subcarrier frequency fsc and the horizontal sync frequency fh have a relationship of fsc=(455/2)fh, and the horizontal sync frequency fh and the vertical sync frequency fv have a relationship of fh=(525/2)fv.

As for the formats of the digital video signal, the International Telecommunication Union (ITU) brings forth recommendation ITU-R BT.656 (formerly known as CCIR 656). The recommendation provides the standard of interfaces for digital component video signals in the 525-line and 625-line television systems operating according to the 4:2:2 level of ITU-R BT.601. The ITU-R BT.601 defines the standard of the studio encoding parameters of a digital television for the standard aspect ratio of 4:3 or for the wide-screen aspect ratio of 16:9.

According to the foregoing ITU recommendation, it is necessary to generate a clock signal (abbreviated to fc from now on) with a frequency 27 MHz, that is, 1716 times the horizontal sync frequency of the NTSC standard television signal with the 525-lines. The frequency is specified considering the interconversion between the PAL and NTSC television signals, and differs from an integer multiple of the color subcarrier frequency of the NTSC television signal. The ratio between fsc and fc is given by $(455/2)/1716=455/(2\times1716)=(13\times7\times5)/(13\times11\times3\times2\times2\times2)=(7\times5)/(11\times3\times2\times2\times2)=35/264$.

The sampling frequencies in the standard "4:2:2 digital component television signal" in the foregoing ITU-R BT.601 are 13.5 MHz for the Y signal and 6.75 MHz for the Cb and Cr signals. Thus, comparing 4 fsc with 13.5 MHz, the clock interval of the former corresponds to phase rotation of 90 degrees of the color subcarrier signal, and that of the latter corresponds to the phase rotation of 95.4545 degrees. As for 2 fsc and 6.75 MHz, they correspond to 180 degrees and 190.91 degrees, respectively.

Consequently, a Y/C separating method is required which can operate at a clock frequency different from an integer multiple of the color subcarrier frequency such as the clock interval of 90 degrees or 180 degrees.

In addition, although the relationship is maintained between the color subcarrier frequency and the horizontal sync frequency in the analog NTSC television signal, the phase correlation between the two signals is usually indefinite. When the sampling is carried out by the clock signal synchronizing with the color subcarrier frequency, the uncertainty of the phase correlation can bring about discontinuity (or mismatch) between the phase of the horizontal sync signal, which is sampled and finally output after undergoing digital processing, and the phase of a signal bearing the phase of the sampled image itself. In addition, the problem brings about an increase in the horizontal blanking of the output signal, that is, a reduction in the horizontal width of the picture period. To solve the problem, new standard RS-170A is proposed which is an improved version of conventional RS-170, the standard of the NTSC television signal. The new standard limits the phase difference between the horizontal sync signal and the color subcarrier signal to within certain bounds with reference to the color subcarrier frequency.

In digital equipment adapted to the NTSC television signal based on the RS-170A standard, the shift in the horizontal direction of an image on a display screen (the horizontal shift is produced because of the above-mentioned discontinuity) does not occur in the television signal after the digital processing. However, comparing the input source signal with the signal passing through the digital processing makes it clear that the shift (horizontal shift) occurs, whose maximum value is the above-mentioned "specified certain boundaries".

To solve the above-mentioned horizontal shift, a technique is implemented, which generates the clock signal in synchronism with the horizontal sync signal of the input signal. In this case, a method called digital PLL has been conventionally used. It generates the color subcarrier signal composed of 8-bit quantized bits using the clock signal, compares the phase of the generated color subcarrier signal with that of the color burst signal in the input signal, and controls the phase of the generated color subcarrier signal such that the phase difference is maintained at a fixed value.

As for a signal source involving the fluctuations in the time axis such as a reproduced signal of an analog VCR or analog VTR, a broadcasting station or the like eliminates the fluctuations in the time axis of the input source signal (particularly the luminance signal) with an expensive, high performance apparatus called a time-base corrector. Generating the clock signal (sampling clock signal) in synchronism with the horizontal sync signal by inputting the signal source involving the fluctuations in the time axis without using the time-base corrector will presents the following problem. When the NTSC television signal digitized by the clock signal is subjected to the above-mentioned conventional Y/C separating method, the dot crawl on the time axis, the so-called cross-color effects, takes place because of the fluctuations in the clock period. A similar problem becomes conspicuous when the relationship between the color subcarrier frequency and the horizontal sync frequency of the input source signal does not maintain the relationship of the above-mentioned NTSC standard as a result of the frequency variations rather than the jitter in the horizontal sync signal of the input source signal.

Therefore, there must be two different methods to carry out the digital processing including the Y/C separation processing: one method is for a NTSC television signal source such as a terrestrial broadcasting source, satellite broadcasting source, and cable television capable of neglecting the time-base fluctuations (jitter); and the other method is for a general NTSC analog television signal involving the time-base fluctuations (jitter).

The present invention is implemented to solve the foregoing problems. Therefore an object of the present invention is to provide a Y/C separator and Y/C separating method of the NTSC television signal capable of reducing the amount of the luminance component signal appearing in the separated color signal, or the amount of the color component signal appearing in the separated luminance signal in carrying out the digital processing of the NTSC analog television signal, even if the sampling frequency is not an integer multiple of the color subcarrier frequency.

Another object of the present invention is to provide a Y/C separator and Y/C separating method of the NTSC television signal capable of reducing the amount of the luminance component signal appearing in the separated color signal, or the amount of the color component signal appearing in the separated luminance signal, even when the clock signal is synchronized with the horizontal sync signal.

Still another object of the present invention is to provide a Y/C separator and Y/C separating method of the NTSC television signal capable of reducing the amount of the luminance component signal appearing in the Y/C-separated color signal, or the amount of the color component signal appearing in the Y/C-separated luminance signal, even in such a case where a signal source such as a reproduced signal of an analog VCR or analog VTR is input which involves the frequency variations in the horizontal sync signal included in the signal source and involves the fluctuations in the time axis, and the quantization is carried out by using the clock signal synchronizing with such a horizontal sync signal, when carrying out the digital processing of the NTSC analog television signal.

DISCLOSURE OF THE INVENTION

According to a first aspect of the present invention, there is provided a Y/C separator for carrying out Y/C separation of a composite color television signal, the Y/C separator comprising: an extractor for receiving the composite color television signal, and for extracting with a delay circuit a target sample, forward and backward samples of the target sample on a same scanning line, upper and lower samples of the target sample located on upper and lower scanning lines adjacent to the target sample, and diagonal samples of the target sample diagonally located with respect to the target sample; a chrominance component calculating section for outputting chrominance calculation values from the forward and backward samples, the upper and lower samples, and the diagonal samples extracted from the extractor; a selector for receiving the outputs of the chrominance component calculating section, and for selecting one of them; a correlation detecting section for receiving the composite color television signal passing through the delay circuit and a filter for rejecting a color component signal, for extracting second samples corresponding to the target sample, the forward and backward samples, the upper and lower samples and the diagonal samples, and for calculating and outputting correlations of the second samples extracted in the vertical, horizontal and two diagonal directions; and a selection table for receiving the output of the correlation detecting section, and for controlling selection of the selector, wherein the Y/C separation of the composite color television signal is carried out in response to the signal output from the selector.

Here, the chrominance calculation from the target sample and the samples horizontally adjacent to the target sample can include $1/(1-\cos \omega Ts)$, where Ts is an interval between the samples and $\omega$ is an angular frequency of a color subcarrier signal, and the chrominance calculation from the samples diagonally adjacent to the target sample can include $1/(1+\cos \omega Ts)$.

According to a second aspect of the present invention, there is provided a Y/C separator for receiving a composite color television signal, and for carrying out its Y/C separation, the Y/C separator comprising: an extractor for receiving the composite color television signal quantized at a frequency which is phase synchronized with a horizontal scanning frequency, and for extracting forward and backward samples on the same line with a target sample delayed by one line from an input line, and upper and lower samples and diagonal samples that are located at upper and lower positions and diagonal positions with respect to the target sample on the upper and lower lines of the target sample by using two 1H delay lines and a plurality of clock delay lines; a chrominance component calculating section for extracting a chrominance component at a position of the target sample by using the samples extracted by the extractor, and for outputting four chrominance calculation values consisting of a chrominance calculation value from samples in a vertical direction including the target sample, a chrominance calculation value from samples in a horizontal direction including the target sample, and chrominance calculation values including calculation of a gradient from samples in diagonal directions; a selector for receiving the four outputs of the chrominance component calculating section, and for selecting one of them; a correlation detecting section for extracting second samples corresponding to the respective samples from the input composite color television signal passing through a filter for rejecting a color component signal and from output signals of the two 1H delay circuits, and for calculating and outputting correlations in the vertical, horizontal and two diagonal directions of the second samples extracted; and a selection table for receiving the four outputs of the correlation detecting section, and for controlling selection of the selector, wherein the Y/C separation of the composite color television signal is carried out in response to the signal output from the selector.

Here, the frequency that is phase synchronized with the horizontal scanning frequency may differ from an integer multiple of a frequency of a color subcarrier frequency.

The chrominance calculation from the target sample and the samples horizontally adjacent to the target sample can include $1/(1-\cos \omega Ts)$, where Ts is an interval between the samples and $\omega$ is an angular frequency of a color subcarrier signal, and the chrominance calculation from the samples diagonally adjacent to the target sample can include $1/(1+\cos \omega Ts)$.

According to a third aspect of the present invention, there is provided a digital Y/C separator for receiving a television signal quantized by a clock signal that is phase synchronized with a horizontal sync signal, and for separating it to a luminance component signal and a chrominance component signal, the digital Y/C separator comprising: Y/C separating means for carrying out computation processing using the target sample and samples representing neighboring pixels of the pixel represented by the target sample among quantized samples, and for separating a chrominance component and a luminance component included in the analog television signal; and phase rotation angle detecting means for outputting a signal representing a value corresponding to a phase rotation angle of a color subcarrier signal per period of the clock signal, the color subcarrier signal being included in the quantized television signal, wherein the Y/C separating means carries out its computation processing in accordance with a signal fed from the phase rotation angle detecting means.

Here, the phase rotation angle detecting means can output a value corresponding to $\omega Ts$ which is a product of $\omega$ and Ts, where $\omega$ is an angular velocity per unit time of the color subcarrier frequency signal and Ts is a period of the clock signal, and the $\omega Ts$ is a value by which $\cos(\omega Ts)$ can be calculated.

The phase rotation angle detecting means can comprise: frequency signal generating means for producing a frequency signal in response to the clock signal; a PLL for controlling the output signal of the frequency signal generating means such that it is synchronized with the color subcarrier frequency signal of the quantized television signal; and means for producing a value corresponding to the value $\omega Ts$ by using control data in the frequency signal generating means.

The Y/C separating means can comprise: extracting means for receiving a quantized composite color television signal, and for extracting, in addition to the target sample which is delayed from an input line by one or two lines, forward and backward samples on a same line as the target sample, and samples located in vertical and diagonal directions of the target sample on upper and lower lines of the target sample, by using at least one delay line for delaying one scanning line period or two scanning line periods and a plurality of clock delay lines; chrominance component calculating means for extracting a chrominance component at a position of the target sample by using the samples extracted by the extracting means, and for outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions; selecting means for receiving the outputs of the chrominance component calculating section, and for selecting one of them; correlation detecting means for extracting second samples corresponding the respective samples by using the quantized television signal passing through a filter for rejecting a color component signal and by using at least one delay line for delaying one scanning line period or two scanning line periods and a plurality of clock delay lines, and for calculating and outputting correlations in the vertical, horizontal and two diagonal directions of the second samples extracted; and a selection table for receiving the outputs of the correlation detecting means, and for controlling selection of the selecting means.

The computation of the chrominance component calculation value in the horizontal direction using the samples in the horizontal direction including the target sample can include $1/(1-\cos \omega Ts)$, where Ts is an interval between the samples and $\omega$ is an angular frequency of a color subcarrier signal, and the computation of the chrominance component calculation values in the diagonal directions by using diagonal samples of the target sample can include $1/(1+\cos \omega Ts)$.

According to a fourth aspect of the present invention, there is provided a digital video processing unit for receiving an analog television signal quantized by a clock signal that is phase synchronized with a horizontal sync signal, and for separating it to a luminance component signal and a chrominance component signal, the digital video processing unit comprising: Y/C separating means for carrying out computation processing using a target sample and samples representing neighboring pixels of a pixel represented by the target sample among quantized samples, and for separating a chrominance component and a luminance component included in the analog television signal; and phase rotation angle detecting means for outputting a signal representing a value corresponding to a phase rotation angle of a color subcarrier signal per period of the clock signal, the color subcarrier signal being included in the quantized television signal, wherein the Y/C separating means carries out its computation processing in accordance with a signal fed from the phase rotation angle detecting means.

Here, the phase rotation angle detecting means can output a value corresponding to $\omega Ts$ which is a product of $\omega$ and Ts, where $\omega$ is an angular velocity per unit time of the color subcarrier frequency signal and Ts is a period of the clock signal, and the $\omega Ts$ can be a value by which $\cos(\omega Ts)$ can be calculated.

Here, the phase rotation angle detecting means can comprise: frequency signal generating means for producing a frequency signal in response to the clock signal; and a PLL for controlling the output signal of the frequency signal generating means such that it is synchronized with the color subcarrier frequency signal of the quantized television signal, wherein the digital video processing unit can produce a value corresponding to the value $\omega Ts$ by using control data in the frequency signal generating means.

The Y/C separating means can comprise: extracting means for receiving a quantized composite color television signal, and for extracting, in addition to the target sample which is delayed from an input line by one or two lines, forward and backward samples on a same line as the target sample, and samples located in vertical and diagonal directions of the target sample on upper and lower lines of the target sample by using at least one delay line for delaying one scanning line period or two scanning line periods and a plurality of clock delay lines; chrominance component calculating means for extracting a chrominance component at a position of the target sample by using the samples extracted by the extracting means, and for outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions; selecting means for receiving the outputs of the chrominance component calculating section, and for selecting one of them; correlation detecting means for extracting second samples corresponding the respective samples by using the quantized television signal passing through a filter for rejecting a color component signal and by using at least one delay line for delaying one scanning line period or two scanning line periods and a plurality of clock delay lines, and for calculating and outputting correlations in the vertical, horizontal and two diagonal directions of the second samples extracted; and a selection table for receiving the outputs of the correlation detecting means, and for controlling selection of the selecting means.

According to a fifth aspect of the present invention, there is provided a Y/C separating method for carrying out Y/C separation of a composite color television signal, the Y/C separating method comprising the steps of: receiving the composite color television signal quantized at a frequency that is phase synchronized with a horizontal scanning frequency, and extracting forward and backward samples on a same line with a target sample, and upper and lower samples and diagonal samples that are located at upper and lower positions and diagonal positions with respect to the target sample on upper and lower lines of the target sample respectively; outputting four calculation values as chrominance component extraction values when extracting a chrominance component at a position of the target sample by using the samples extracted, the four calculation values consisting of a chrominance calculation value from samples in a vertical direction including the target sample, a chrominance calculation value from samples in a horizontal direction including the target sample, and chrominance calculation values including calculation of a gradient from samples in diagonal directions; extracting second samples (T1–T9) corresponding the respective samples (S1–S9) from the input composite color television signal passing through a low-pass filter for rejecting a color component signal and from output signals from two 1H delay circuits, calculating correlations in the vertical, horizontal and two diagonal directions of the second samples extracted, and selecting and outputting one of the four chrominance component extraction values in accordance with comparing results of the calculation results; and carrying out the Y/C separation of the input signal in response to the signal selected and output.

Here, the frequency that is phase synchronized with the horizontal scanning frequency can differ from an integer multiple of a frequency of a color subcarrier frequency.

The chrominance calculation from the target sample and the samples horizontally adjacent to the target sample can include $1/(1-\cos \omega Ts)$, where Ts is an interval between the samples and $\omega$ is an angular frequency of a color subcarrier signal, and the chrominance calculation from the samples diagonally adjacent to the target sample can include $1/(1+\cos \omega Ts)$.

According to a sixth aspect of the present invention, there is provided a digital Y/C separating method of receiving an analog television signal quantized by a clock signal that is phase synchronized with a horizontal sync signal, and for separating it to a luminance component signal and a chrominance component signal, the digital Y/C separating method comprising: a phase rotation angle detecting step of outputting a signal representing a value corresponding to a phase rotation angle of a color subcarrier signal per period of the clock signal, the color subcarrier signal being included in the quantized television signal; and Y/C separating step of carrying out computation processing using the target sample and samples representing neighboring pixels of the pixel represented by the target sample among quantized samples, and for separating a chrominance component and a luminance component included in the analog television signal, wherein said computation processing in the Y/C separating step is carried out in accordance with the value corresponding to the phase rotation angle, which is output with respect to the scanning line of the target sample by the phase rotation angle detection step.

Here, the phase rotation angle detecting step can output a value corresponding to $\omega Ts$ which is a product of $\omega$ and Ts, where $\omega$ is an angular velocity per unit time of the color subcarrier frequency signal and Ts is a period of the clock signal, and the $\omega Ts$ can be a value by which $\cos(\omega Ts)$ can be calculated.

The Y/C separating step can comprise: an extracting step of receiving a quantized composite color television signal, and extracting, in addition to the target sample which is delayed from an input line by one or two lines, forward and backward samples on a same line as the target sample, and samples located in vertical and diagonal directions of the target sample on upper and lower lines of the target sample by repeating delay of one scanning line period or two scanning line periods; a chrominance component separation calculating step of extracting a chrominance component at a position of the target sample by using the samples extracted at the extracting step, and outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions; a correlation detecting step of receiving the quantized television signal passing through a filter for rejecting a color component signal, extracting second samples corresponding the respective samples by repeating the delay of one scanning line period or two scanning line periods, and calculating and outputting correlations in the vertical, horizontal and two diagonal directions of the second samples extracted; and a step of selecting and outputting the chrominance component calculation values supplied from the chrominance component separation calculating step in response to the input supplied from the correlation detecting step.

BEST MODE FOR CARRYING OUT THE INVENTION

The invention will now be described with reference to the accompanying drawings.

Figure 7:
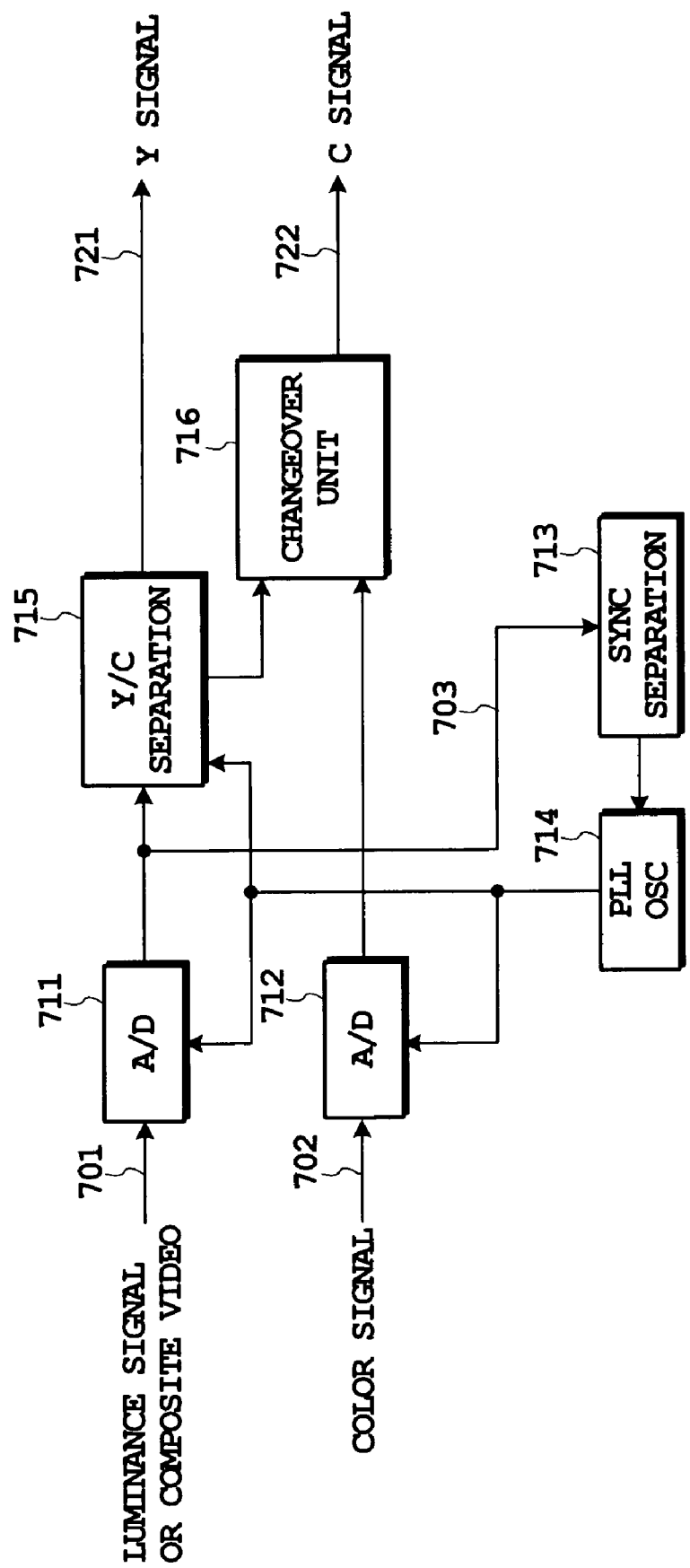
FIG. 7 is a block diagram showing a configuration that includes a Y/C separation section in accordance with the present invention, and quantizes the input signal.

FIG. 7 is a block diagram showing a major portion of an analog/digital conversion apparatus in accordance with the present invention, which receives an NTSC television signal, and converts it to a digital video signal based on the ITU-R BT.601 or 656 standard.

In FIG. 7, reference numerals 711 and 712 designate A/D converters (quantizers) for receiving a composite video signal 701 or a luminance signal 701 and a color signal 702 as analog signals, and for converting them into digital signals. The normal composite television signal is digitized by the A/D converter 711 only, and is separated to the luminance signal and color signal by a Y/C separation section 715 at the next stage. As for the case of separate analog video signals, the A/D converter 711 carries out the A/D conversion (quantizing) of the luminance component signal 701, and the A/D converter 712 carries out the A/D conversion (quantizing) of the color signal 702.

The output of the A/D converter 712 and the separated color signal output from the Y/C separation section 715 are supplied to a color demodulation processing section (not shown) after being switched by a changeover unit 716 controlled in conjunction with an input signal changeover unit (not shown).

The A/D converter 711 converts both the video component and sync component of the input signal. In contrast to the video signal processing system, a clock generating section (designated by reference numerals 713 and 714) for generating a system clock for carrying out the digital processing includes a sync separation section 713 and a PLL oscillator 714 as shown in FIG. 7. The sync separation section 713 receives the sync component signal 703 from the A/D converter 711 and carries out the sync separation. The PLL oscillator 714 receives the H-SYNC component signal from the sync separation section 713 and generates the clock signal with a frequency 1716 times the signal frequency. The PLL oscillator 714 delivers the clock signal to the A/D converters 711 and 712, and to various processing sections including the Y/C separation section 715. To be more precise, the various processing sections are supplied with the clock with a frequency of 13.5 MHz, half the frequency of 27 MHz the PLL oscillator generates (the frequency 858 times the frequency of the H-SYNC).

Figure 1:
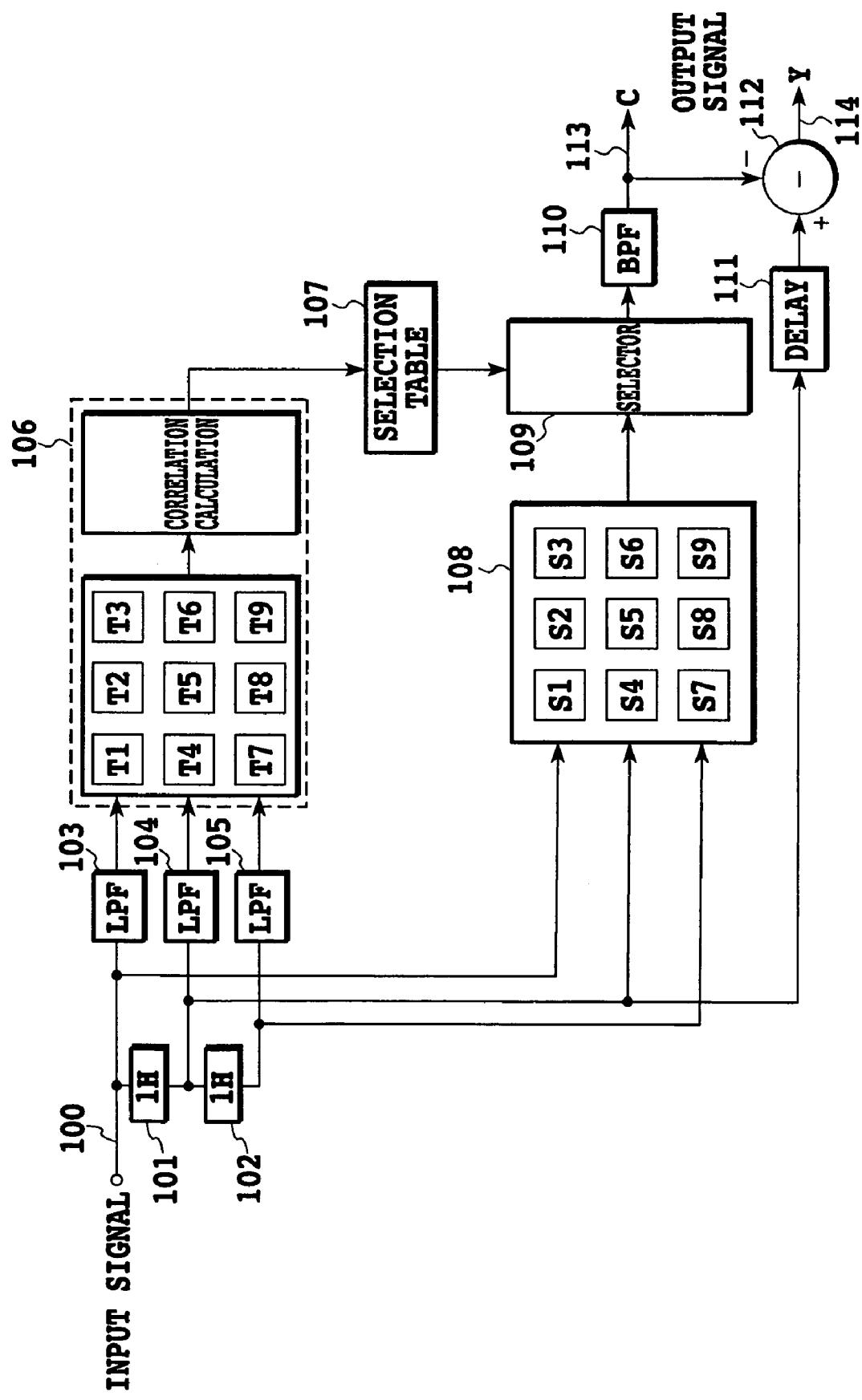
FIG. 1 is a block diagram showing a configuration of an embodiment in accordance with the present invention, that is, a configuration of a circuit or apparatus in its entirety for carrying out Y/C separation to which a quantized NTSC television signal is input.

FIG. 1 is a block diagram showing a configuration of a Y/C separator to which a quantized NTSC television signal is input. The Y/C separator is an adaptive Y/C separator which inputs the NTSC television signal quantized by the sampling clock signal to a line 100, and outputs C and Y output signals (113 and 114). It is assumed here that the clock signal of the circuit has a frequency equal to the sampling frequency 13.5 MHz of the luminance signal defined in the above-mentioned ITU-R BT.601 "4:2:2 digital component television signal" standard, and that it is generated in synchronism with the horizontal sync signal of the input signal. The present invention, however, is not limited to the sampling frequency 13.5 MHz. It is applicable to any frequency except for the clock frequency twice the color subcarrier frequency.

In FIG. 1, reference numerals 101 and 102 each designate a delay circuit for causing a delay of one scanning period (denoted as 1H). Reference numerals 103–105 each designate a low-pass filter for rejecting the color signal component. The reference numeral 106 designates a correlation detecting section. The reference numeral 107 designates a selection table for receiving correlation calculation results from the correlation detecting section and for carrying out switching control of a selector which will be described below. The reference numeral 108 designates a chrominance component calculating section for calculating and extracting the chrominance component signal by a variety of methods. The reference numeral 110 designates a bandpass filter for passing the color subcarrier frequency component. The reference numeral 111 designates a delay for delaying the phase of the video (composite video) signal to match its timing to the separated chrominance signal. The reference numeral 112 designates a subtracter.

Figure 2:
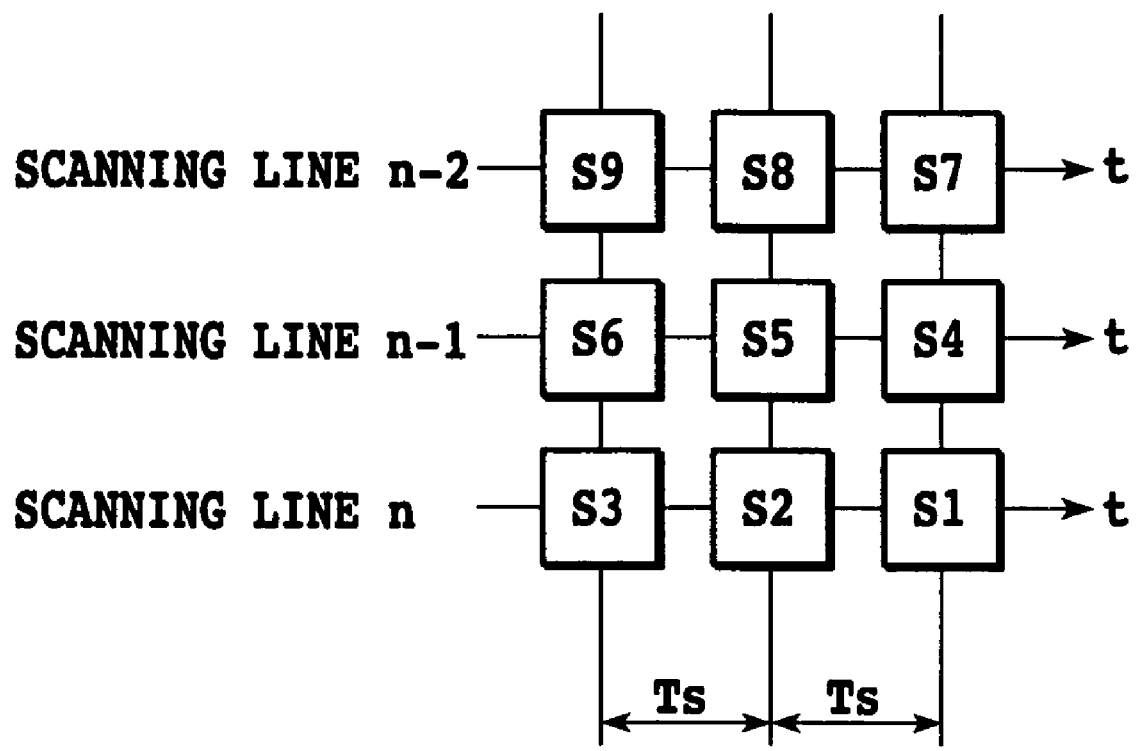
FIG. 2 is a diagram illustrating positional relationships between quantized samples shown in FIG. 1.

In FIG. 1, squares in the correlation detecting section 106 and chrominance component calculating section 108 designate quantized samples, and numerals 1–9 designate positional relationships between the quantized samples as shown in FIG. 2. FIG. 2 is a diagram illustrating locations of the quantized samples as pixels in the NTSC television signal. On the three scanning lines n, n−1 and n−2, the central quantized sample designated by the reference numeral S5 on the central scanning line n−1 is used as the target sample. In the case of the PAL television signal, the (n−1)th line of FIG. 2 corresponds to the (n−2)th line of the PAL television signal, and the (n−2)th line of FIG. 2 corresponds to the (n−4)th line of the PAL television signal. In FIG. 2, the sample S5 located at the center is made the target sample, for which the correlation detecting section 106 detects the correlations, and the chrominance component calculating section extracts the chrominance component.

FIG. 2 illustrates the upper sample S8, lower sample S2 and right and left samples S4 and S6 adjacent to the target sample S5 on the screen, as well as the samples S1, S3, S7 and S9 adjacent to the target sample S5 in the diagonal directions. The interval between the adjacent samples on the same scanning line is Ts. As for these samples, their sampled values are delayed by the period Ts through a clock delay unit so that they can be accessed simultaneously.

Incidentally, as shown in FIG. 1, the chrominance component calculating section 108 for carrying out the Y/C separation is supplied with the delayed quantized sample values, and the correlation detecting section 106 is supplied with the quantized samples from which the color components are removed through the LPFs. The quantized samples of the two sections (blocks designated by the reference numerals 106 and 108) undergo phase matching by the delay circuits so that they correspond to their counterpart samples. Specifically, the sample S1 and sample T1 represent the same sample on the screen, and the samples S2–S9 correspond to T2–T9, respectively.

The chrominance component calculating section 108 for the Y/C separation carries out the following calculation to extract the chrominance component C(t).

vertical direction:

$$C(t) = v(½)(-S2 + 2 \times S5 - S8) \quad (1)$$

horizontal direction:

$$C(t) = h(½)(-S4 + 2 \times S5 - S6) \quad (2)$$

diagonal direction 1:

$$C(t) = d_1(½)(-S1 + 2 \times S5 - S9) \quad (3)$$

diagonal direction 2:

$$C(t) = d_2(½)(-S3 + 2 \times S5 - S7) \quad (4)$$

where $v+=½$, $h=1/(1-\cos \omega Ts)$, $d_1=d_2=1/(1+\cos \omega Ts)$, which are referred to as normalizing coefficients. The symbols S1–S9 are quantized values of the pixels having the foregoing relations with the sampled value S5 of the target pixel. The symbol $\omega$ is the color subcarrier angular frequency, and Ts is the sampling period. In addition, $\omega Ts$ represents the product of $\omega$ and Ts, that is, $\omega \times Ts$, and $\cos \omega Ts$ is a shortened form of $\cos(\omega \times Ts)$. The value $\omega Ts$ represents the phase rotation angle of the color subcarrier signal in the clock period. The calculation results of the foregoing expressions (1)–(4) are supplied to the selector 109.

The correlation detecting section 106 performs the following calculations on the sampled values T1–T9, from which the color component signal is removed through the low-pass filters.

vertical direction:

$$T28 = abs(2 \times T5 - T2 - T8) \quad (5)$$

horizontal direction:

$$T46 = abs(2 \times T5 - T4 - T6) \quad (6)$$

diagonal direction 1:

$$T19 = abs(2 \times T5 - T1 - T9) \quad (7)$$

diagonal direction 2:

$$T37 = abs(2 \times T5 - T3 - T7) \quad (8)$$

where abs( ) is a function representing the absolute value of the calculation result in the round brackets. In addition, T28 represents the calculation result in the vertical direction including the samples T2 and T8, and T46, T19 and T37 represent the calculation results including the samples indicated by the respective digits.

According to the calculation results of the foregoing four expressions, a decision is made as to the differences in the correlations in the respective directions by comparing the calculation results. For example, when T28 in expression (5) is minimum, a decision is made that the correlation in the vertical direction is maximum. In this case, the selector 109 is controlled such that the chrominance component signal extraction value is selected which uses the pixels in the vertical direction given by the foregoing expression (1).

Comparing the total of six correlations between the calculation results of the foregoing four expressions (5)–(8), the selection table 107 decides the direction in which the luminance signal has a strong correlation from the compared results, and outputs a signal for selecting the chrominance component signal extraction value using the sampled values in the direction with the strong correlation. This enables the Y/C separation in accordance with the correlation of the input signal. The method is especially effective when the luminance correlation coincides with the color correlation.

In the present embodiment, the calculation results of the foregoing four expressions (5)–(8) are supplied to the selection table so that the output of the selection table 107 controls the selector 109. The selection table 107 substantially makes a decision as to the six compared results between the four values. In the comparison, it is possible to assign different weights to the horizontal direction, vertical direction and diagonal directions. For example, the weight of the horizontal direction is made largest, followed by that of the vertical direction, and the weight of the diagonal direction is made smallest, and so on. Thus, the correlation is detected in accordance with the sampling interval.

The selection table 107 receives the above-mentioned four calculation results, and carries out selecting control such that one of the extraction results of the chrominance component signals in the horizontal direction, vertical direction, diagonal direction 1 and diagonal direction 2 supplied to the selector 109 is selected.

The output of the selector 109 is supplied to the bandpass filter 110 that extracts only the color subcarrier frequency component and outputs it as the chrominance signal 113.

On the other hand, the signal of the scanning line including the target pixel S5, that is, the input signal, is output from the 1H delay circuit 101, and is supplied to the subtracter 112 via the delay circuit (delay) 111 to align time base phase with the chrominance signal 113. The above-mentioned chrominance signal 113 is also supplied to the subtracter that subtracts the chrominance signal 113 from the output signal of the delay circuit 111. As a result, the subtracter outputs the signal from which the chrominance component is removed, that is, the luminance signal 114.

The setting of the selection table 107 is experimentally determined, and its contents are finally fixed such that it has a Y/C separation function suitable for the purpose. As for the LPFs as shown in FIG. 1, they can be each replaced by a notch filter as long as it can remove the color signal and output the luminance signal.

The Y/C separator has the configuration as described above. When the signal from a studio camera in a broadcasting station is used as the input signal to the Y/C separator, for example, the frequencies of the horizontal and vertical sync signals and color subcarrier signal included in the input signal will conform to the standard accurately. Thus, when only such a signal is used as the input signal, it is possible to fix the color subcarrier angular frequency ω and sampling interval Ts as fixed constant, that are used for the calculation in the chrominance component calculating section.

However, it is unrealistic to assume that only a signal with accurate frequency and phase relationships such as the signal output from equipment of a broadcasting station is used as the input signal. For example, the reproduced signal of a VTR or VCR may be input, or a signal may be used in which the relationship between the frequency of the horizontal sync signal and that of the color subcarrier signal may not conform to the standard. To perform the above-mentioned Y/C separation of such a signal by using the configuration as shown in FIG. 1, constants cannot be assigned to the values v, h, $d_1$ and $d_2$ in the foregoing expressions (1)–(4) because the constants will cause considerable errors in the calculation results corresponding to the variations in the input. The errors will increase the amount of the luminance component signal appearing in the Y/C-separated color component signal, or the amount of the color component signal appearing in the Y/C-separated luminance signal. To avoid such an unfavorable increase, the errors must be reduced as much as possible. In order to reduce the errors, it is necessary to detect a value that enables the calculation of the normalizing coefficients, that is, ωTs.

Figure 4:
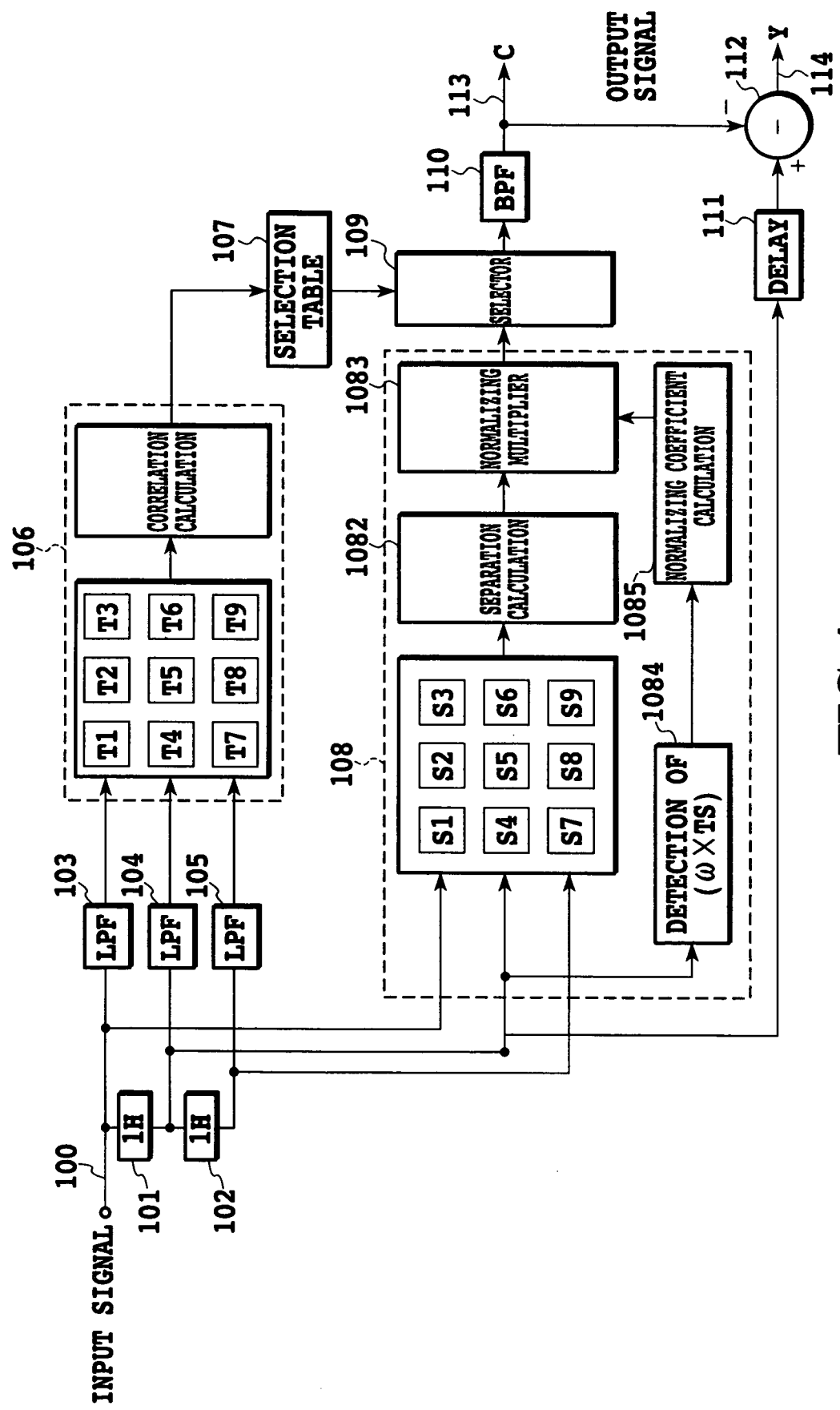
FIG. 4 is a block diagram showing a detailed configuration of a correlation detecting section and a chrominance component calculating section for calculating and extracting a chrominance (color) component signal by a variety of methods as shown in FIG. 1, and particularly illustrating a case where the chrominance component separation calculation uses, as the coefficients necessary for the calculation, values that are computed from detected items from the line including a target pixel rather than using preset constants.
Figure 5:
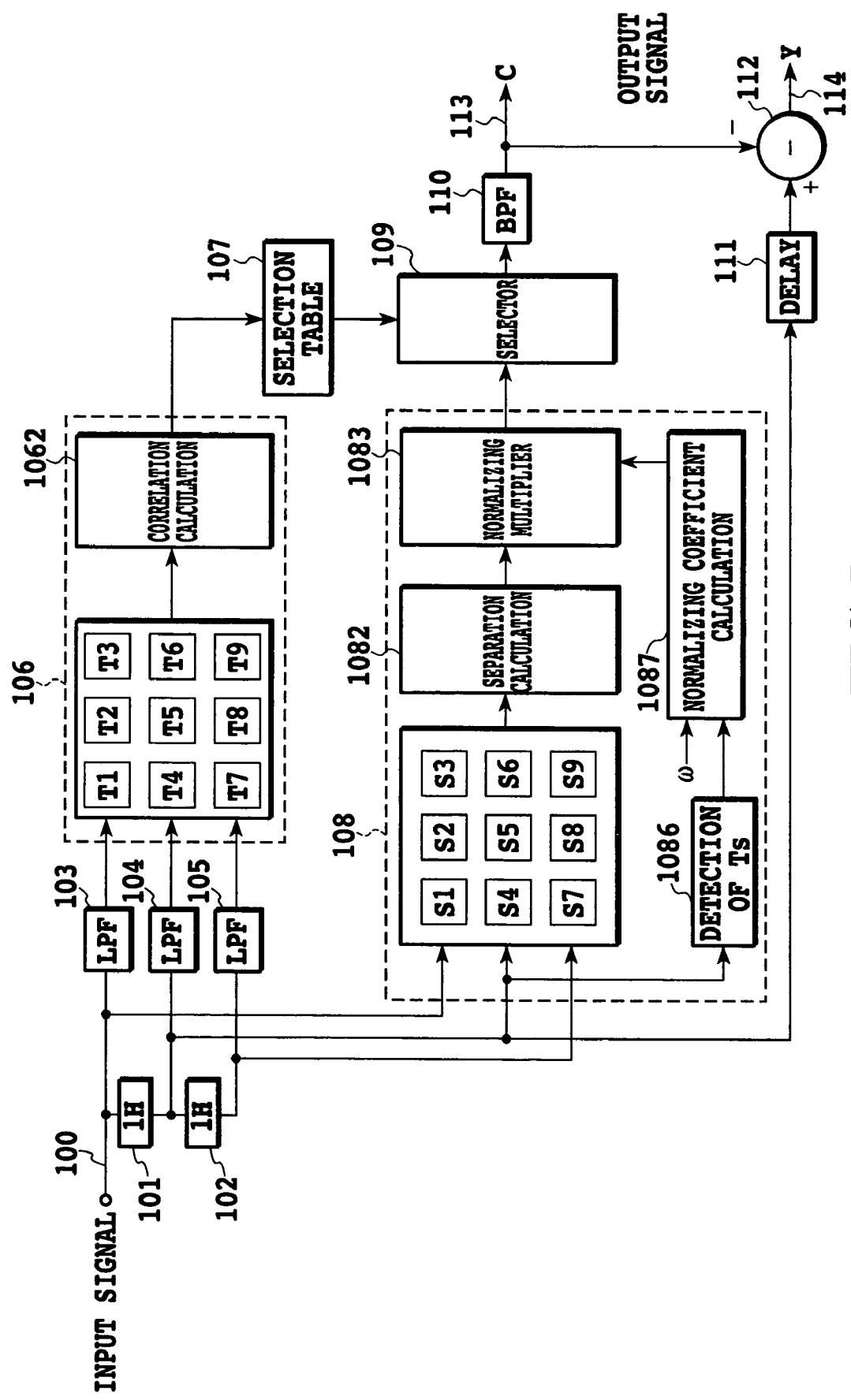
FIG. 5 is a block diagram similar to that of FIG. 4, illustrating a case that computes the coefficients necessary for the calculation by detecting a clock period Ts of the line including the target pixel, and by using a value $\omega$ as a constant, thereby carrying out the chrominance component separation calculation.
Figure 6:
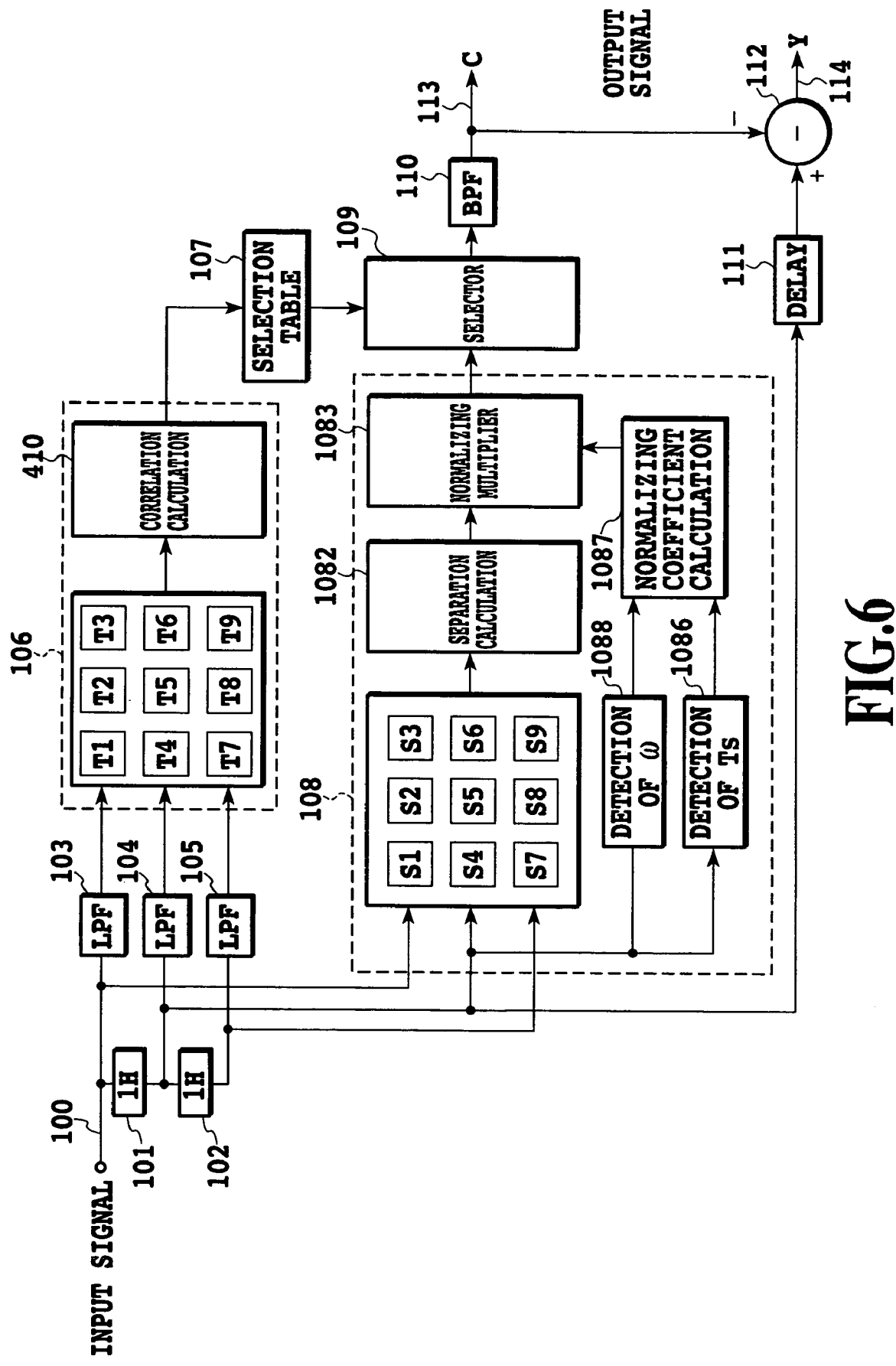
FIG. 6 is a block diagram illustrating a configuration that obtains the angular velocity $\omega$ of the color burst signal, which is a fixed constant in FIG. 5, through a circuit that actually detects the angular velocity on the target line and outputs it.

FIGS. 4–6 each show a configuration that inputs a common television signal having inaccurate and fluctuation factors, and carries out the Y/C separation of the television signal.

The chrominance component calculating section 108 will now be described in more detail. First, as a preparation for describing the chrominance component calculating section 108, a digital PLL (phase-locked loop) operating in response to the above-mentioned sampling clock signal will be described with reference to FIGS. 3A and 3B. The PLL has the above-mentioned 13.5 MHz frequency, for example, and generates a signal (similar to quantized video data) which is phase locked to the color burst signal in the television signal (composite video signal), quantized by the sampling clock signal synchronized with the horizontal sync signal in the input television signal.

Figure 3A:
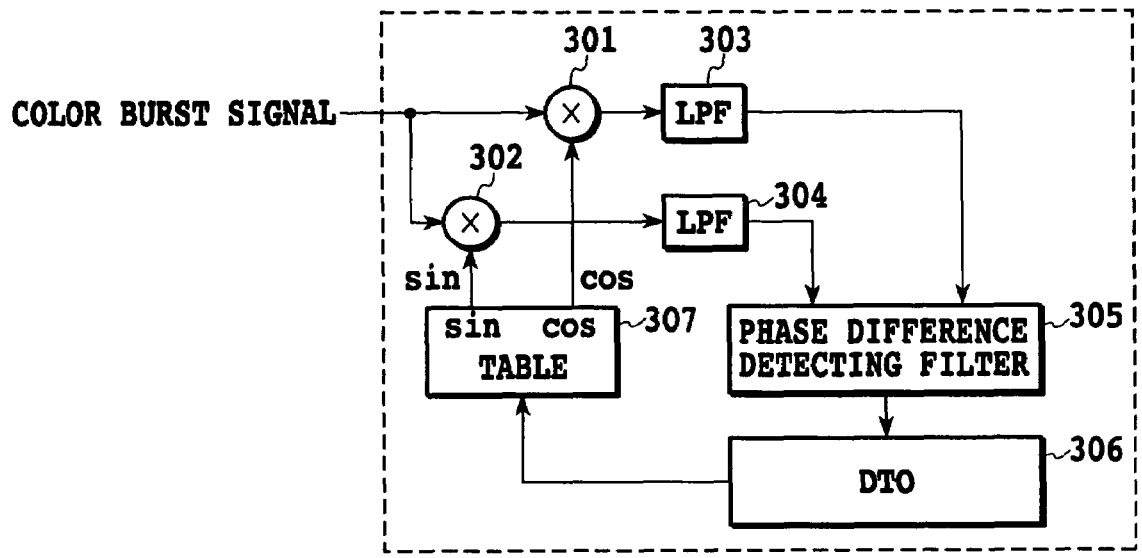
FIG. 3A is a block diagram showing a configuration for generating a color subcarrier signal synchronized with a color burst signal included in an input signal.

FIG. 3A is a diagram illustrating part of a block for receiving the quantized color signal and carrying out the color demodulation. The block is composed of multipliers 301 and 302, LPFs 303 and 304, a phase difference detecting and filtering section 305, a DTO (digital time oscillator) 306, and a sin/cos table 307. Although not shown in this figure, when the input signal is a chrominance signal, LPFs 303 and 304 output an R-Y signal and a B-Y signal, respectively. The color demodulation scheme implements a scheme called X demodulation and Z demodulation by means of a digital scheme.

In FIG. 3A, consider a case where the sin/cos table 307 consists of a ROM with a 10-bit address input, and the address is sequentially incremented from 0 to 1023. In this case, the sin/cos table 307 sequentially outputs, as the values of signals of SIN and COS, values that are obtained by quantizing sine and cosine waveforms at timings dividing the waveforms into 1024 equal parts. In addition, one increment of the address corresponds to 360/1024 degree, or 2π/1024 radian when the ROM stores the data corresponding to one cycle period from address 0 to address 1023.

Assume that the circuit as shown in FIG. 3A is driven by the clock signal with a frequency of 13.5 MHz, and that the sin/cos table outputs signals with the frequency of the NTSC color subcarrier frequency. In this case, since a phase rotation of 95.4545 degrees is caused during one clock period, the average of the address value variation for driving the ROM table is 271.515 (95.4545*1024/360=271.515). For example, when the output value of the DTO for generating the address of the table ROM is zero at a certain clock timing, the address value varying such as 271, 543, 814, 62 (=1086−1024), 333 (=1357−1024), . . . is output at every clock interval. The average value of the address value variations is 271.515.

Figure 3B:
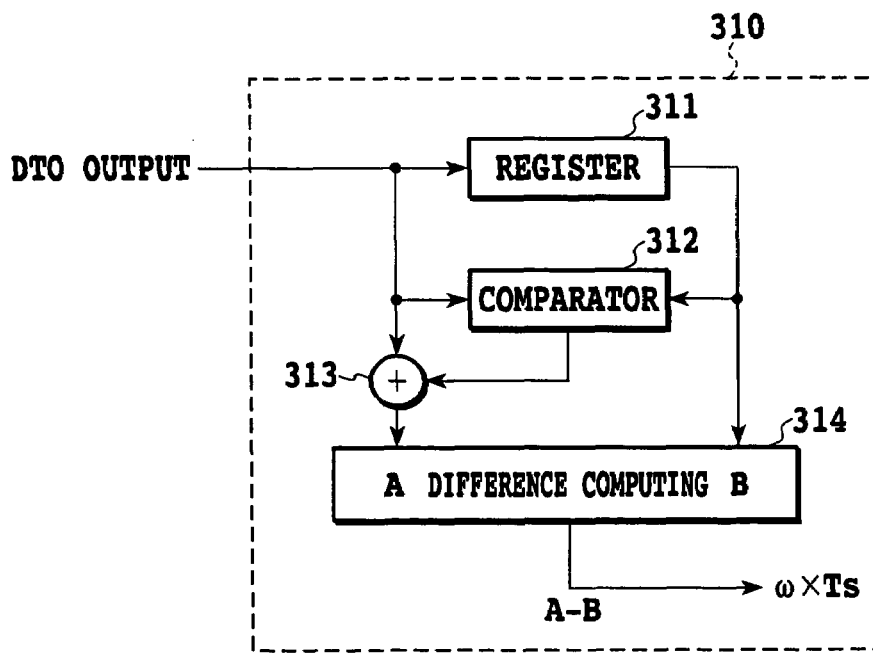
FIG. 3B is a diagram showing a configuration for extracting the data corresponding to a phase rotation angle ($\omega \times Ts$) per clock period of the color burst signal from a driving signal of a ROM table for generating a quantized bit string of the color subcarrier signal of FIG. 3A.

FIG. 3B is a diagram illustrating an example of a phase rotation angle detecting means, that is, a circuit for receiving the output value of the DTO that varies as described above, and for producing the rotation angle variation of the subcarrier at each clock period. The data output from the DTO is stored in a register 311 at each clock pulse. Thus, the latest output A of the DTO is obtained at the input of the register 311, and its previous output value B is obtained as the output of the register 311. A comparator 312 and an adder 313 constitute a circuit for preventing the calculation result of (A−B) from becoming negative in preparation for a difference computing circuit 314 to compute (A−B). The comparator compares the two input values. When the value from the input side of the register 311 is less than the value from the output side of the register 311, it supplies the adder 313 with a value 1024 and otherwise with a value zero in the case of 10 bits, for example. This will be described in more detail by way of example of the above-mentioned values. When the input value to the register 311 is 62 and its output value is 814, the adder 313 adds 1024 to 62, and supplies the difference computing circuit 314 with a value 1086 as its A input value. As a result, the difference computing circuit 314 produces the output (A−B) of 1086−814=272. Accordingly, when the values 0, 271, 543, 814, 62, 333, . . . are input as the output values of the DTO, the difference of 271, 272, 271, 272, 271, . . . is obtained. The accuracy of the difference can be improved by increasing the number of bits of the DTO (its internal registers).

The difference produced as described above represents the phase rotation angle of the color subcarrier signal per clock period. The rotation angle is expressed as $(271/1024) \times 2\pi$ (radian) in terms of radian in the foregoing example. Thus, the difference computing circuit can produce the value corresponding to $\omega Ts$ as its output (A−B), where $\omega$ is the angular frequency of the color subcarrier signal of the input signal, and $Ts$ is the period of the clock signal. In addition, the value is a value from which the value of $\cos \omega Ts$ can be derived.

A block 1084 as shown in FIG. 4 has the configuration as shown in FIGS. 3A and 3B, and outputs the value $\omega Ts$, that is, the phase rotation angle of the color subcarrier signal per clock period on the scanning line including the target sample.

The chrominance component calculating section 108 in FIG. 4 includes the block 1084 that receives the data on the scanning line including the target sample. The block 1084 detects $\omega Ts$ on the scanning line data by using the above-mentioned circuit or method, and supplies the detected value $\omega Ts$ to a block 1085. The block 1085 calculates the normalizing coefficients in the foregoing expressions (1)–(4) from the input value $\omega Ts$. In the configuration as shown in FIG. 4, the normalizing coefficients v, h, $d_1$ and $d_2$ in the foregoing expressions (1)–(4) are corrected to the following values v', h', $d_1$' and $d_2$', respectively.

$$v'=1/(1-\cos 858\omega Ts) \qquad (9)$$

$$h'=1/(1-\cos \omega Ts) \qquad (10)$$

$$d_1'=1/(1-\cos 859\omega Ts) \qquad (11)$$

$$d_2'=1/(1-\cos 857\omega Ts) \qquad (12)$$

where the numbers 858, 859 and 857 represents the case of handling the NTSC television signal, in which the clock signal of a frequency 858 times the horizontal sync frequency is used. As for the PAL standard, these values become 1728, 1729 and 1727, respectively. These numbers indicate that the distance between the samples used for the calculation is represents in terms of the number of clocks. In addition, since they represent the phase rotation of $\omega Ts$ per clock pulse, they can be given by the foregoing expressions. Here, the detected $\omega Ts$ is simply multiplied by an integer. This is based on the assumption that the variations in $\omega Ts$ per scanning line is moderate. The conversion from the detected $\omega Ts$ to the normalizing coefficients can also be achieved by using a table.

On the other hand, a separation calculating section 1082 in the chrominance component calculating section 108 carries out the following calculation among the calculations of the foregoing expressions (1)–(4).

vertical direction:

$$C(t)'=(\tfrac{1}{2})(-S2+2 \times S5-S8) \qquad (13)$$

horizontal direction:

$$C(t)'=(\tfrac{1}{2})(-S4+2 \times S5-S6) \qquad (14)$$

diagonal direction 1:

$$C(t)'=(\tfrac{1}{2})(-S1+2 \times S5-S9) \qquad (15)$$

diagonal direction 2:

$$C(t)'=(\tfrac{1}{2})(-S3+2 \times S5-S7) \qquad (16)$$

A normalizing multiplier 1083, receiving the calculation result from the separation calculating section, multiplies the calculation result of expression (13) in the vertical direction by the normalizing coefficient $1/(1-\cos 858\omega Ts)$ supplied from a normalizing coefficient computing section. Likewise, the normalizing multiplier 1083 multiplies the calculation result of expression (14) in the horizontal direction by the normalizing coefficient $1/(1-\cos 858\omega Ts)$ supplied from the normalizing coefficient computing section. In addition, it multiplies the calculation result of expression (15) in the diagonal direction 1 by the normalizing coefficient $1/(1-\cos 859\omega Ts)$ supplied from the normalizing coefficient computing section. Likewise, it multiplies the calculation result of expression (16) in the diagonal direction 2 by the normalizing coefficient $1/(1-\cos 857\omega Ts)$ supplied from the normalizing coefficient computing section, thereby completing the calculations of the foregoing expressions (1)–(4).

The chrominance component calculating section 108 with the configuration of FIG. 4 as described above can carry out more accurate Y/C separation than in the case where the constants are used, even if it cannot apply the constants to the input signal as the value $\omega Ts$, such as when are produced signal is input from a VCR based on the VHS standard.

FIG. 5 is a diagram showing a configuration of another embodiment in accordance with the present invention. It carries out the chrominance component separation calculation similar to that described above by only detecting the period $Ts$ of the clock signal, when the clock period $Ts$ has fluctuations even though the color subcarrier frequency included in the input signal has only negligible fluctuations. A block 1086, using a clock signal generated by a crystal oscillator oscillating at a fixed frequency in combination with the circuit as shown in FIGS. 3A and 3B, can produce the value corresponding to the detected clock period Ts by generating a signal synchronized with the clock signal. The block designated by the reference numeral 1087, receiving the data on the angular frequency ω of the color subcarrier signal included in the input signal as the constant, outputs the above-mentioned normalizing coefficients using the value ω and the value Ts supplied from the block 1086.

The chrominance component calculating section 108 with the configuration as shown in FIG. 5 operates effectively in cases where it cannot apply the constant to the input signal as the value ωTs, and where the fluctuations in the angular frequency ω of the color subcarrier signal of the input signal is negligible, but only the fluctuations in the clock period Ts are present. As for the reproduced signal of a VTR or VCR, for example, it can carry out the Y/C separation at higher accuracy than the case where the constant is used, by detecting the clock period Ts and reflecting it in the chrominance component separation calculation. In other words, it can reduce the amount of the luminance component signal appearing in the separated color signal (chrominance signal), or the amount of the color (chrominance) component signal appearing in the separated luminance signal.

FIG. 6 is a block diagram showing a configuration of still another embodiment. It independently detects the angular frequency ω of the color subcarrier signal in the input signal and the period Ts of the clock signal, and carries out the above-mentioned chrominance separation calculation. A block 1088 is added to the configuration of FIG. 5. The block 1088 detects the angular frequency ω of the color subcarrier signal included in the signal. The detected value ω is supplied to the block 1087. The block 1087, using the input values ω and Ts, computes the normalizing coefficients for the chrominance separation calculations, and supplies them to the normalizing multiplier 1083.

The characteristics of the chrominance component calculating section 108 in the configuration of FIG. 6 are the same as those in the configuration of FIG. 5.

Further, although the data on the line of the target pixel is input to produce the detection output in the detection of ωTs in FIG. 4, of Ts in FIG. 5 or of ω and Ts in FIG. 6, this is not essential. For example, when the circuit as shown in FIG. 3A is present in a circuit for receiving the signal of the signal line as shown in FIGS. 4–6, that is, in a stage previous to the signal line input to the chrominance component calculating section 108 in the signal path, it is obvious that the detecting circuit (circuit designated by the reference numeral 1084, 1086 or 1088) can be attached to the circuit, so that the output data of the detection circuit is delayed to match the timing with the scanning line data of the target sample. In this case, means for detecting ωTs, that is, a phase rotation angle detecting means for detecting the phase rotation angle of the color subcarrier signal included in the quantized television signal per cycle period of the clock signal is assumed to be placed apart from the Y/C separating means.

Figure 8:
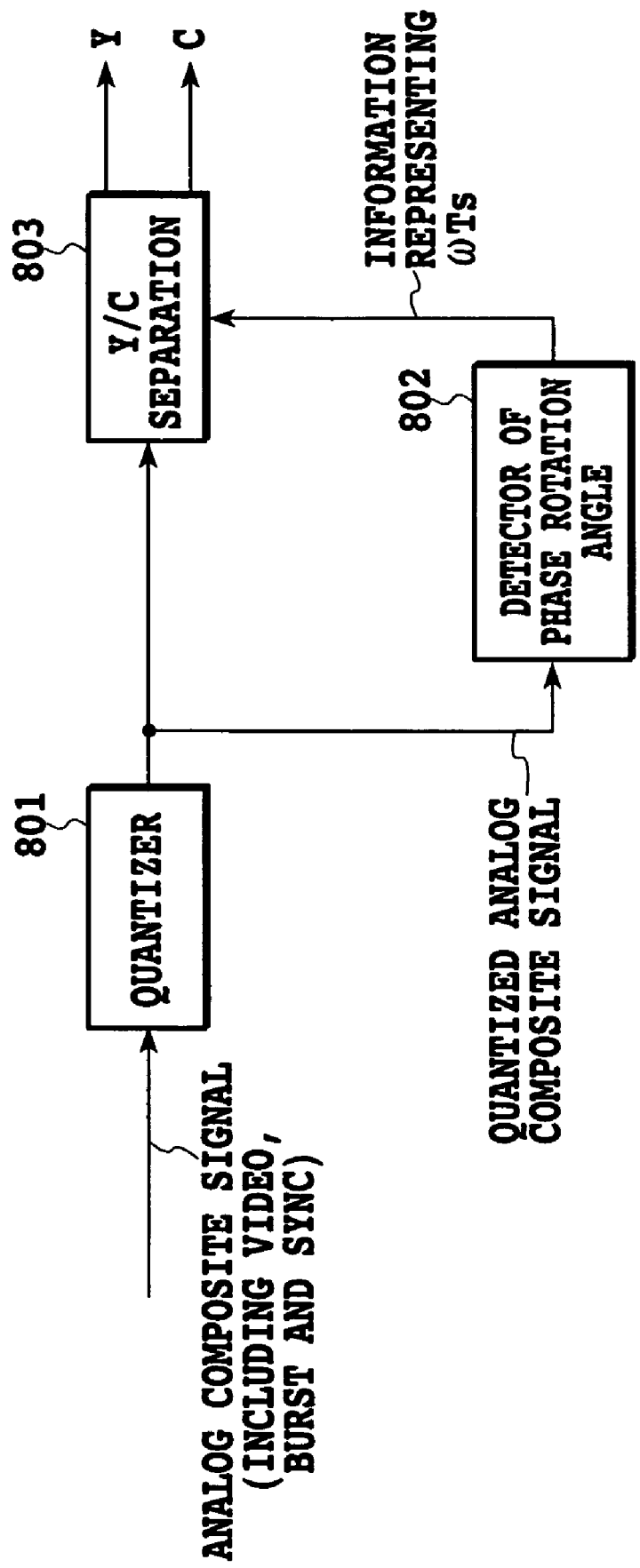
FIG. 8 is a block diagram showing a main configuration in accordance with the present invention.

FIG. 8 is a diagram showing a main configuration in accordance with the present invention including the foregoing cases. In FIG. 8, the reference numeral 801 designates a quantizing means that receives an analog composite color television signal, quantizes the signal by the clock signal synchronized with the horizontal sync signal included in the signal, and outputs a quantized composite color television signal. The quantization is carried out for the portions including the video section, color burst section and sync section of the input signal. The reference numeral 802 designates a phase rotation angle detecting means for detecting and outputting a value corresponding to the phase rotation angle (ωTs) per period of the quantizing clock of the color subcarrier signal included in the quantized composite color television signal. The reference numeral 803 designates a Y/C separating means for receiving the quantized composite color television signal, and outputs the Y signal and C signal by carrying out various processings including the calculation for the Y/C separation. The various calculations for the Y/C separation are carried out in accordance with the detected output value from the phase rotation angle detecting means. However, the object of FIG. 8, which is included to explain the subject matter of the present invention, is to show the relationship between the phase rotation angle detecting means and the Y/C separating means. For example, it is obvious that the present invention can include a system in which the phase rotation angle detecting means includes a conversion means to cos ωTs, and supplies the value of cos ωTs to the Y/C separating means. Likewise, the present invention can include a system in which the function of generating the normalizing coefficients is removed from the Y/C separating means to be placed at the side of the phase rotation angle detecting means. Thus dividing the functions definitely between the means for detecting the phase rotation angle and the means for outputting the separated Y and C signals is within the ability of those skilled in the art. It is only required for the calculation to decide as to whether the detecting point in the phase rotation angle detecting means and the point of the target sample used for carrying out the Y/C separation are placed on the same scanning line, or whether the former indicates the scanning line immediately after the line including the latter.

The configuration for carrying out the Y/C separation assumes the following. First, since the sampling clock signal is generated in synchronization with the horizontal sync signal, that is, the oscillation frequency of the PLL is varied after the appearance of the horizontal sync signal, it is assumed that the sampling clock signal is constant between the samples on the target scanning line for carrying out the Y/C separation. Therefore it is possible to assume that the phase rotation angle ωTs per clock pulse is invariable on the scanning line. In addition, the variations between the target scanning line and the adjacent scanning lines (one or two lines above, or one or two lines below) are assumed to be moderate from the operation characteristics of the PLL. Accordingly, the values ω, ωTs or Ts to be detected are assumed to have different values for respective scanning lines of the input signal. Consequently, to reduce the errors of the calculation about the target sample, it becomes necessary to use the value representing ω, ωTs or Ts of the scanning line of the target sample.

In the embodiments in accordance with the present invention, a reproduced output of a VCR, for example, is assumed to be the input signal capable of being input and subjected to the processing (including the Y/C separation processing).

In the reproduced output of the VCR, fluctuations in the color subcarrier frequency is within a range of ±70 ppm by actual measurement, and the fluctuations between the horizontal sync signal is up to 1500 ppm. This means that the period Ts of the sampling clock signal, which is generated in phase synchronization with the horizontal sync signal, has fluctuations up to 1500 ppm. Accordingly, it is possible to assume that a greater part of the fluctuations of ωTs of the signal is due to fluctuations in Ts. To handle such a signal, although the configuration as shown in FIG. 4 is best, the configuration as shown in FIG. 5 is also effective. In this case, although the fluctuations in ω is uncancelable, the fluctuations in Ts is cancelable, and hence the accuracy of the Y/C separation can be improved by that amount.

Although the foregoing description of the present invention is made by way of example of the NTSC television signal, it is also possible to handle a PAL standard television signal by placing the delay of the delay circuits 101 and 102 at an amount corresponding to two lines.

INDUSTRIAL APPLICABILITY

As described above, according generally to the present invention, the system is configured such that it detects the four types of correlations in the vertical, horizontal and diagonal directions of the signal obtained by removing the color component from the input signal, and supplies the four correlation values to a table, and that in response to the output of the table, it selects the chrominance component extraction value using the pixels in the vertical, horizontal and diagonal directions of the input signal. Thus, it can carry out high-performance Y/C separation effectively when the correlation of the luminance component coincides with the correlation of the color component. In addition, in extracting the chrominance component, the system detects the phase rotation angle per clock period of the color subcarrier frequency included in the input signal, and uses the detected value for the calculation to extract the chrominance component. Thus, it can tolerate the fluctuations in the frequency of the color subcarrier frequency signal in the input signal. Furthermore, because of this characteristic, the present invention is applicable to an apparatus for processing a television-input signal in conformity with the standards. Moreover, it is effectively applicable to an apparatus for processing a television signal including fluctuations in the time axis such as the reproduced output signal of a VCR and the like.

What is claimed is:

1. A Y/C separator for carrying out Y/C separation of a composite color television signal, said Y/C separator comprising:

an extractor for receiving the composite color television signal, and for extracting with a delay circuit a target sample, forward and backward samples of the target sample on a same scanning line, upper and lower samples of the target sample located on upper and lower scanning lines adjacent to the target sample, and diagonal samples of the target sample diagonally located with respect to the target sample;

a chrominance component calculating section for outputting chrominance calculation values from the forward and backward samples, the upper and lower samples, and the diagonal samples extracted from said extractor;

a selector for receiving the outputs of said chrominance component calculating section, and for selecting one of them;

a correlation detecting section for receiving the composite color television signal passing through the delay circuit and a filter for rejecting a color component signal, for extracting a second samples corresponding to the target sample, the forward and backward samples, the upper and lower samples and the diagonal samples, and for calculating and outputting correlations of the second samples extracted in the vertical, horizontal and two diagonal directions; and a selection table for receiving the output of said correlation detecting section, and for controlling selection of said selector, wherein the Y/C separation of the composite color television signal is carried out in response to the signal output from said selector.

2. A Y/C separator for receiving a composite color television signal, and for carrying out its Y/C separation, said Y/C separator comprising:

an extractor for receiving the composite color television signal quantized at a frequency which is phase synchronized with a horizontal scanning frequency, and for extracting forward and backward samples on a same line with a target sample, and upper and lower samples and diagonal samples that are located at upper and lower positions and diagonal positions with respect to the target sample on the upper and lower lines of the target sample, by using two 1 H delay lines and a plurality of clock delay lines;

a chrominance component calculating section for extracting a chrominance component at a position of the target sample by using the samples extracted by said extractor, and for outputting four chrominance calculation values consisting of a chrominance calculation value from samples in a vertical direction including the target sample, a chrominance calculation value from samples in a horizontal direction including the target sample, and chrominance calculation values including calculation of a gradient from samples in diagonal directions;

a selector for receiving the four outputs of said chrominance component calculating section, and for selecting one of them;

a correlation detecting section for extracting second samples corresponding the respective samples from the input composite color television signal passing through a filter for rejecting a color component signal and from output signals of the two 1H delay circuits, and for calculating and outputting correlations in the vertical, horizontal and two diagonal directions of the second samples extracted; and a selection table for receiving the four outputs of said correlation detecting section, and for controlling selection of said selector, wherein the Y/C separation of the composite color television signal is carried out in response to the signal output from said selector.

3. The Y/C separator as claimed in claim 2, wherein the frequency that is phase synchronized with the horizontal scanning frequency differs from an integer multiple of a frequency of a color subcarrier frequency.

4. The Y/C separator as claimed in any one of claims 1–3, wherein the chrominance calculation from the target sample and the samples horizontally adjacent to the target sample includes $1/(1-\cos(\omega Ts))$, where Ts is an interval between the samples and $\omega$ is an angular frequency of a color subcarrier signal, and the chrominance calculation from the samples diagonally adjacent to the target sample includes $1/(1+\cos(\omega Ts))$.

5. A digital Y/C separator for receiving a television signal quantized by a clock signal that is phase synchronized with a horizontal sync signal, and for separating it into a luminance component signal and a chrominance component signal, said digital Y/C separator comprising:

Y/C separating means for carrying out computation processing using the target sample and samples representing neighboring pixels of the pixel represented by the target sample among quantized samples, and for separating a chrominance component and a luminance component included in the analog television signal; and phase rotation angle detecting means for outputting a signal representing a value corresponding to a phase rotation angle of a color subcarrier signal per period of the clock signal, the color subcarrier signal being included in the quantized television signal, wherein said Y/C separating means carries out its computation processing in accordance with a signal fed from said phase rotation angle detecting means.

6. The digital Y/C separator as claimed in claim 5, wherein said phase rotation angle detecting means outputs a value corresponding to ωTs which is a product of ω and Ts, where ω is an angular velocity per unit time of the color subcarrier frequency signal and Ts is a period of the clock signal, and wherein the ωTs is a value by which cos(ωTs) can be calculated.

7. The digital Y/C separator as claimed in claim 6, wherein said phase rotation angle detecting means comprises:
   frequency signal generating means for producing a frequency signal in response to the clock signal;
   difference detecting and filtering means for controlling the output signal of said frequency signal generating means such that it is synchronized with the color subcarrier frequency signal of the quantized television signal;
   digital time oscillation means for receiving the output signal from said difference detecting and filtering means, and for providing control data to said frequency generating means; and
   means for producing a value corresponding to the value of the product of ω and Ts by using said control data for said frequency signal generating means.

8. The digital Y/C separator as claimed in claim 5, wherein said Y/C separating means comprises:
   extracting means for receiving a quantized composite color television signal, and for extracting, in addition to the target sample which is delayed from an input line by one or two lines, forward and backward samples on a same line as the target sample, and samples located in vertical and diagonal directions of the target sample on upper and lower lines of the target sample, by using at least one delay line for delaying one scanning line period or two scanning line periods and a plurality of clock delay lines;
   chrominance component calculating means for extracting a chrominance component at a position of the target sample by using the samples extracted by said extracting means, and for outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions;
   selecting means for receiving the outputs of said chrominance component calculating section, and for selecting one of them;
   correlation detecting means for extracting second samples corresponding the respective samples by using the quantized television signal passing through a filter for rejecting a color component signal and by using at least one delay line for delaying one scanning line period or two scanning line periods and a plurality of clock delay lines, and for calculating and outputting correlations in the vertical, horizontal and two diagonal directions of the second samples extracted; and
   a selection table for receiving the outputs of said correlation detecting means, and for controlling selection of said selecting means.

9. The digital Y/C separator as claimed in claim 8, wherein said phase rotation angle detecting means outputs a value corresponding to ωTs which is a product of ω and Ts, where ω is an angular velocity per unit time of the color subcarrier frequency signal and Ts is a period of the clock signal, and wherein the ωTs is a value from which cos(ωTs) can be calculated.

10. The digital Y/C separator as claimed in claim 9, wherein said phase rotation angle detecting means comprises:
    frequency signal generating means for producing a frequency signal in response to the clock signal; and
    difference detecting and filtering means for controlling the output signal of said frequency signal generating means such that it is synchronized with the color subcarrier frequency signal of the quantized television signal; and
    digital time oscillation means for receiving the output signal from said difference detecting and filtering means, and for providing control data to said frequency generating means,
    wherein the digital Y/C separator produces a value corresponding to the value of the product of ω and Ts by using said control data for said frequency signal generating means.

11. The digital Y/C separator as claimed in claim 8, wherein the computation of the chrominance component calculation value in the horizontal direction using the samples in the horizontal direction including the target sample includes 1/(1−cos(ωTs)), where Ts is an interval between the samples and ω is an angular frequency of a color subcarrier signal, and the computation of the chrominance component calculation values in the diagonal directions by using diagonal samples of the target sample includes 1/(1+cos(ωTs)).

12. The digital Y/C separator as claimed in claim 11, wherein said phase rotation angle detecting means outputs a value corresponding to ωTs which is a product of ω and Ts, where ω is an angular velocity per unit time of the color subcarrier frequency signal and Ts is a period of the clock signal, and wherein the ωTs is a value by which cos(ωTs) can be calculated.

13. The digital Y/C separator as claimed in claim 12, wherein said phase rotation angle detecting means comprises:
    frequency signal generating means for producing a frequency signal in response to the clock signal; and
    difference detecting and filtering means for controlling the output signal of said frequency signal generating means such that it is synchronized with the color subcarrier frequency signal of the quantized television signal; and
    digital time oscillation means for receiving the output signal from said difference detecting and filtering means, and for providing a control data to said frequency generating means,
    wherein the digital Y/C separator produces a value corresponding to the value of the product of ω and Ts by using said control data for said frequency signal generating means.

14. A digital video processing unit for receiving an analog television signal quantized by a clock signal that is phase synchronized with a horizontal sync signal, and for separating it to a luminance component signal and a chrominance component signal, said digital video processing unit comprising:
   Y/C separating means for carrying out computation processing using a target sample and samples representing neighboring pixels of a pixel represented by the target sample among quantized samples, and for separating a chrominance component and a luminance component included in the analog television signal; and phase rotation angle detecting means for outputting a signal representing a value corresponding to a phase rotation angle of a color subcarrier signal per period of the clock signal, the color subcarrier signal being included in the quantized television signal, wherein said Y/C separating means carries out its computation processing in accordance with a signal fed from said phase rotation angle detecting means.

15. The digital video processing unit as claimed in claim 14, wherein said phase rotation angle detecting means outputs a value corresponding to $\omega Ts$ which is a product of $\omega$ and Ts, where $\omega$ is an angular velocity per unit time of the color subcarrier frequency signal and Ts is a period of the clock signal, and wherein $\omega Ts$ is a value by which $\cos(\omega Ts)$ can be calculated.

16. The digital video processing unit as claimed in claim 15, wherein said phase rotation angle detecting means comprises: frequency signal generating means for producing a frequency signal in response to the clock signal; and difference detecting and filtering means for controlling the output signal of said frequency signal generating means such that it is synchronized with the color subcarrier frequency signal of the quantized television and signal; and digital time oscillation means for receiving the output signal from said difference detecting and filtering means, and for providing a control data to said frequency generating means, wherein the digital video processing unit produces a value corresponding to the value of the product of $\omega$ and Ts by using said control data for said frequency signal generating means.

17. The digital video processing unit as claimed in claim 14, wherein said Y/C separating means comprises:

extracting means for receiving a quantized composite color television signal, and for extracting, in addition to the target sample which is delayed from an input line by one or two lines, forward and backward samples on a same line as the target sample, and samples located in vertical and diagonal directions of the target sample on upper and lower lines of the target sample by using at least one delay line for delaying one scanning line period or two scanning line periods and a plurality of clock delay lines;

chrominance component calculating means for extracting a chrominance component at a position of the target sample by using the samples extracted by said extracting means, and for outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions;

selecting means for receiving the outputs of said chrominance component calculating section, and for selecting one of them;

correlation detecting means for extracting second samples by using the quantized television signal passing through a filter for rejecting a color component signal and by using at least one delay line for delaying one scanning line period or two scanning line periods and a plurality of clock delay lines, and for calculating and outputting correlations in the vertical, horizontal and two diagonal directions of the second samples extracted; and a selection table for receiving the outputs of said correlation detecting means, and for controlling selection of said selecting means.

18. A Y/C separating method for carrying out Y/C separation of a composite color television signal, said Y/C separating method comprising the steps of:

receiving the composite color television signal quantized at a frequency that is phase synchronized with a horizontal scanning frequency, and extracting forward and backward samples (S4, S6) on a same line with a target sample (S5), and upper and lower samples (S8) and diagonal samples (S1, S3, S7, S9) that are located at upper and lower positions and diagonal positions with respect to the target sample on upper and lower lines of the target sample, respectively;

outputting four calculation values as chrominance component extraction values when extracting a chrominance component at a position of the target sample by using the samples extracted, the four calculation values consisting of a chrominance calculation value from samples in a vertical direction including the target sample, a chrominance calculation value from samples in a horizontal direction including the target sample, and chrominance calculation values including calculation of a gradient from samples in diagonal directions;

extracting second samples (T1–T9) corresponding the respective samples (S1–S9) from the input composite color television signal passing through a low-pass filter for rejecting a color component signal and from output signals from two 1H delay circuits, calculating correlations in the vertical, horizontal and two diagonal directions of the second samples extracted, and selecting and outputting one of the four chrominance component extraction values in accordance with comparing results of the calculation results; and carrying out the Y/C separation of the input signal in response to the signal selected and output.

19. The Y/C separating method as claimed in claim 18, wherein the frequency that is phase synchronized with the horizontal scanning frequency differs from an integer multiple of a frequency of a color subcarrier frequency.

20. The Y/C separating method as claimed in claim 18 or 19, wherein the chrominance calculation from the target sample and the samples horizontally adjacent to the target sample includes $1/(1-\cos(\omega Ts))$, where Ts is an interval between the samples and $\omega$ is an angular frequency of a color subcarrier signal, and the chrominance calculation from the samples diagonally adjacent to the target sample includes $1/(1+\cos(\omega Ts))$.

21. A digital Y/C separating method of receiving an analog television signal quantized by a clock signal that is phase synchronized with a horizontal sync signal, and for separating it to a luminance component signal and a chrominance component signal, said digital Y/C separating method comprising:

a phase rotation angle detecting step of outputting a signal representing a value corresponding to a phase rotation angle of a color subcarrier signal per period of the clock signal, the color subcarrier signal being included in the quantized television signal; and Y/C separating step of carrying out computation processing using the target sample and samples representing neighboring pixels of the pixel represented by the target sample among quantized samples, and for separating a chrominance component and a luminance component included in the analog television signal, wherein said computation processing in the Y/C separating step is carried out in accordance with the value corresponding to the phase rotation angle, which is output with respect to the scanning line of the target sample by the phase rotation angle detection step.

22. The digital Y/C separating method as claimed in claim 21, wherein the phase rotation angle detecting step outputs a value corresponding to $\omega Ts$ which is a product of $\omega$ and $Ts$, where $\omega$ is an angular velocity per unit time of the color subcarrier frequency signal and $Ts$ is a period of the clock signal, and wherein $\omega Ts$ is a value by which $\cos(\omega Ts)$ can be calculated.

23. The digital Y/C separating method as claimed in claim 21, wherein the Y/C separating step comprises:

an extracting step of receiving a quantized composite color television signal, and extracting, in addition to the target sample which is delayed from an input line by one or two lines, forward and backward samples on a same line as the target sample, and samples located in vertical and diagonal directions of the target sample on upper and lower lines of the target sample by repeating delay of one scanning line period or two scanning line period;

a chrominance component separation calculating step of extracting a chrominance component at a position of the target sample by using the samples extracted at the extracting step, and outputting chrominance component calculation values consisting of a chrominance component calculation value computed from samples in a vertical direction including the target sample, a chrominance component calculation value computed from samples in a horizontal direction including the target sample, and chrominance component calculation values including calculation of a gradient computed from samples in diagonal directions;

a correlation detecting step of receiving the quantized television signal passing through a filter for rejecting a color component signal, extracting second samples corresponding the respective samples by repeating the delay of one scanning line period or two scanning line period, and calculating and outputting correlations in the vertical, horizontal and two diagonal directions of the second samples extracted; and a step of selecting and outputting the chrominance component calculation values supplied from the chrominance component separation calculating step in response to the input supplied from the correlation detecting step.

* * * * *

UNITED STATES PATENT AND TRADEMARK OFFICE
CERTIFICATE OF CORRECTION

PATENT NO. : 7,110,045 B2 Page 1 of 1
APPLICATION NO. : 10/470018
DATED : September 19, 2006
INVENTOR(S) : Ken Ishihara It is certified that error appears in the above-identified patent and that said Letters Patent is hereby corrected as shown below:

Claim 1, column 19, line 56, "extracting a second" should read --extracting second--.

Claim 2, column 20, line 12, "1 H" should read --1H--.

Claim 2, column 20, line 28, "corresponding the" should read --corresponding to the--.

Claim 8, column 21, line 57, "corresponding the" should read --corresponding to the--.

Claim 16, column 23, line 26, "television and signal;" should read --television signal;--.

Claim 18, column 24, line 15, "(S8)" should read --(S2, S8)--.

Claim 18, column 24, line 30, "corresponding the" should read --corresponding to the--.

Claim 23, column 25, line 27, "period;" should read --periods;--.

Claim 23, column 26, line 16, "corresponding the" should read --corresponding to the--.

Claim 23, column 26, line 18, "period, and" should read --periods, and--.

Signed and Sealed this

Ninth Day of January, 2007

JON W. DUDAS
*Director of the United States Patent and Trademark Office*